United States Patent [19]

Shimaoka

[11] Patent Number: 5,124,792

[45] Date of Patent: Jun. 23, 1992

[54] MULTISCAN RECEIVER WITH ORDERED CHANGEOVER OF OPERATING PARAMETERS

[75] Inventor: Katsuaki Shimaoka, Osaka, Japan

[73] Assignee: Matsushita Electric Industrial Co., Ltd., Osaka, Japan

[21] Appl. No.: 648,841

[22] Filed: Jan. 31, 1991

[30] Foreign Application Priority Data

Feb. 1, 1990 [JP]  Japan .................................. 2-22442

[51] Int. Cl.⁵ .............................................. H04N 3/27
[52] U.S. Cl. ..................................... 358/140; 358/158; 358/188; 315/395
[58] Field of Search ................. 315/395, 371; 358/140, 358/180, 188, 242, 158

[56] References Cited

U.S. PATENT DOCUMENTS

| | | | |
|---|---|---|---|
| 4,144,545 | 3/1979 | Fernsler et al. | 358/158 |
| 4,516,169 | 5/1985 | Truskalo | 358/188 X |
| 4,633,146 | 12/1986 | Babcock | 315/395 |
| 4,673,984 | 6/1987 | Kikuchi et al. | 358/158 |
| 4,679,091 | 7/1987 | Kikuchi et al. | 358/188 X |
| 4,942,471 | 7/1990 | Chikuma et al. | 358/180 X |
| 4,958,228 | 9/1990 | Kutsuki | 358/158 |

FOREIGN PATENT DOCUMENTS 1-71380  3/1989  Japan .

Primary Examiner—James J. Groody
Assistant Examiner—Mark R. Powell
Attorney, Agent, or Firm—Pollock, VandeSande & Priddy

[57] ABSTRACT

In a television receiver, a change in a horizontal frequency of an input television signal between a high frequency and a low frequency is detected. A horizontal oscillation frequency, a horizontal deflection drive pulse width, and a horizontal blanking period are changed in a first predetermined sequence in response to a change in the horizontal frequency of the input television signal from the high frequency to the low frequency. The horizontal oscillation frequency, the horizontal deflection drive pulse width, and the horizontal blanking period are changed in a second predetermined sequence in response to a change in the horizontal frequency of the input television signal from the low frequency to the high frequency. The first and second predetermined sequences are opposite to each other.

4 Claims, 3 Drawing Sheets

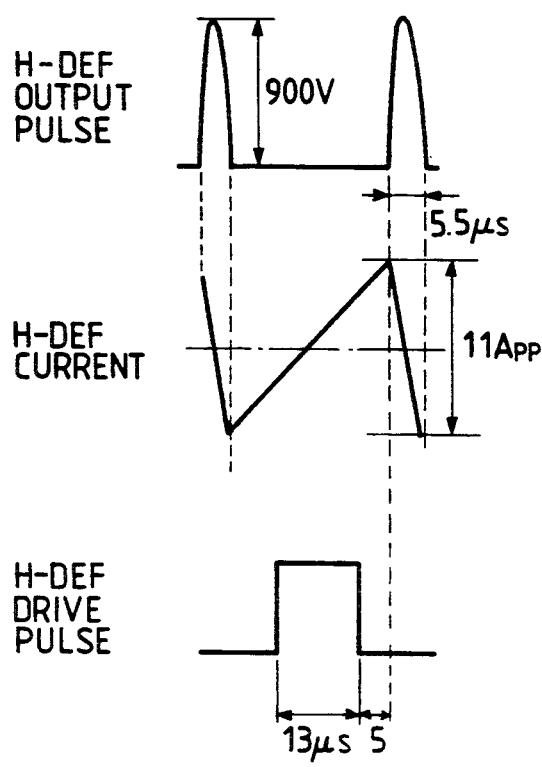
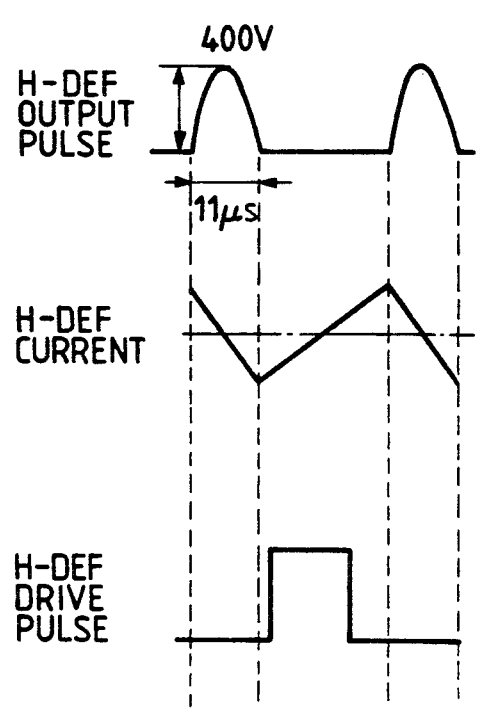
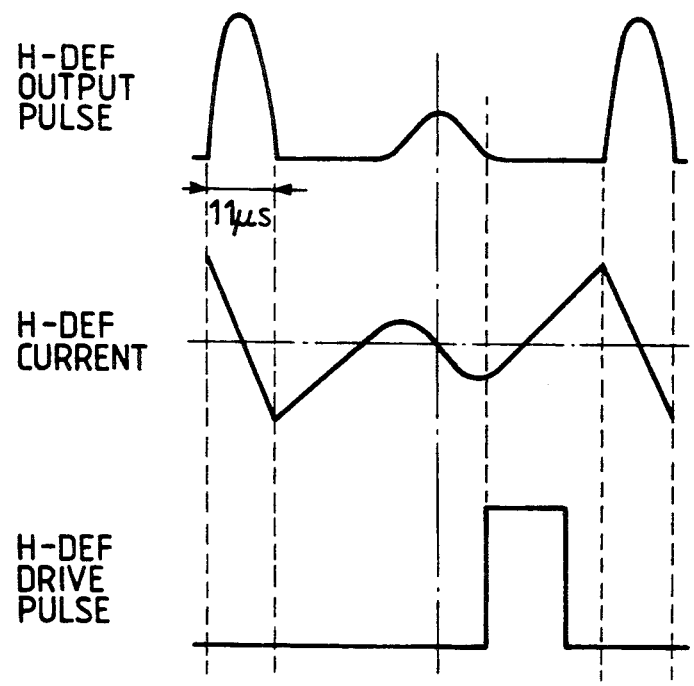

MULTISCAN RECEIVER WITH ORDERED CHANGEOVER OF OPERATING PARAMETERS

BACKGROUND OF THE INVENTION

1. Field of the Invention

This invention relates to a television receiver and a method in the same.

2. Description of the Prior Art

Recently, high-density television systems have been developed. "Clear-Vision" and "Hi-Vision" are examples of such high-density television systems. The horizontal frequency of a video signal of such a high-density television system is significantly higher than the horizontal frequency of a video signal of a conventional television system such as an NTSC system, a PAL system, or a SECAM system. For example, the horizontal frequency of the high-density television system is equal to 31.5 KHz for "Clear-Vision" and 33.75 KHz for "Hi-Vision". On the other hand, the horizontal frequency of the low-density television system is equal to about 15 KHz.

The conventional television system such as the NTSC system, the PAL system, or the SECAM system is also referred to as the low-density television system or the low-frequency mode television system. The high-density television system is also referred to as the high-frequency mode television system.

There is a known television receiver which can accept both a high-frequency mode television signal and a low-frequency mode television signal. This known television receiver has a mechanism for continuously varying the horizontal oscillation frequency of a horizontal deflection circuit in response to the horizontal frequency of an input television signal to equalize the horizontal oscillation frequency and the input signal horizontal frequency. In the known television receiver, the width of horizontal deflection drive pulses is controlled so that the "ON" duty cycle of the horizontal deflection drive signal will be constant with respect to the horizontal oscillation frequency of the horizontal deflection circuit. In the known television receiver, during a horizontal blanking period, the bias voltage of the horizontal deflection circuit is varied as a function of the horizontal frequency of the input television signal. The known television receiver has a problem that its circuit structure tends to be complicated.

There is another known television receiver which can accept both a high-frequency mode television signal and a low-frequency mode television signal. This known television receiver has a mechanism for changing the horizontal oscillation frequency of the horizontal deflection circuit, the "ON" duty cycle of the horizontal deflection drive signal, and the horizontal blanking period to match with an input television signal. The known television receiver has a problem that the switching element (the switching transistor) of the horizontal deflection output circuit requires a great rated power.

SUMMARY OF THE INVENTION

It is an object of this invention to provide an improved television receiver.

It is another object of this invention to provide an improved method in a television receiver.

A first aspect of this invention provides a television receiver comprising detecting means for detecting changes in a horizontal frequency of an input television signal between a high frequency and a low frequency; first changing means responsive to the detecting means for changing a horizontal oscillation frequency, a horizontal deflection drive pulse width, and a horizontal blanking period in a first predetermined sequence in response to a change in the horizontal frequency of the input television signal from the high frequency to the low frequency; and second changing means responsive to the detecting means for changing the horizontal oscillation frequency, the horizontal deflection drive pulse width, and the horizontal blanking period in a second predetermined sequence in response to a change in the horizontal frequency of the input television signal from the low frequency to the high frequency, wherein the first and second predetermined sequences are opposite to each other.

A second aspect of this invention provides a method in a television receiver, comprising the steps of detecting changes in a horizontal frequency of an input television signal between a high frequency and a low frequency; changing a horizontal oscillation frequency, a horizontal deflection drive pulse width, and a horizontal blanking period in a first predetermined sequence in response to a change in the horizontal frequency of the input television signal from the high frequency to the low frequency; and changing the horizontal oscillation frequency, the horizontal deflection drive pulse width, and the horizontal blanking period in a second predetermined sequence in response to a change in the horizontal frequency of the input television signal from the low frequency to the high frequency, wherein the first and second predetermined sequences are opposite to each other.

BRIEF DESCRIPTION OF THE DRAWINGS

FIGS. 2–5 are timing diagrams showing the waveforms of horizontal deflection output pulses, a horizontal deflection current, and a horizontal deflection drive pulse in the television receiver of FIG. 1.

DESCRIPTION OF THE PREFERRED EMBODIMENT

Figure 1:
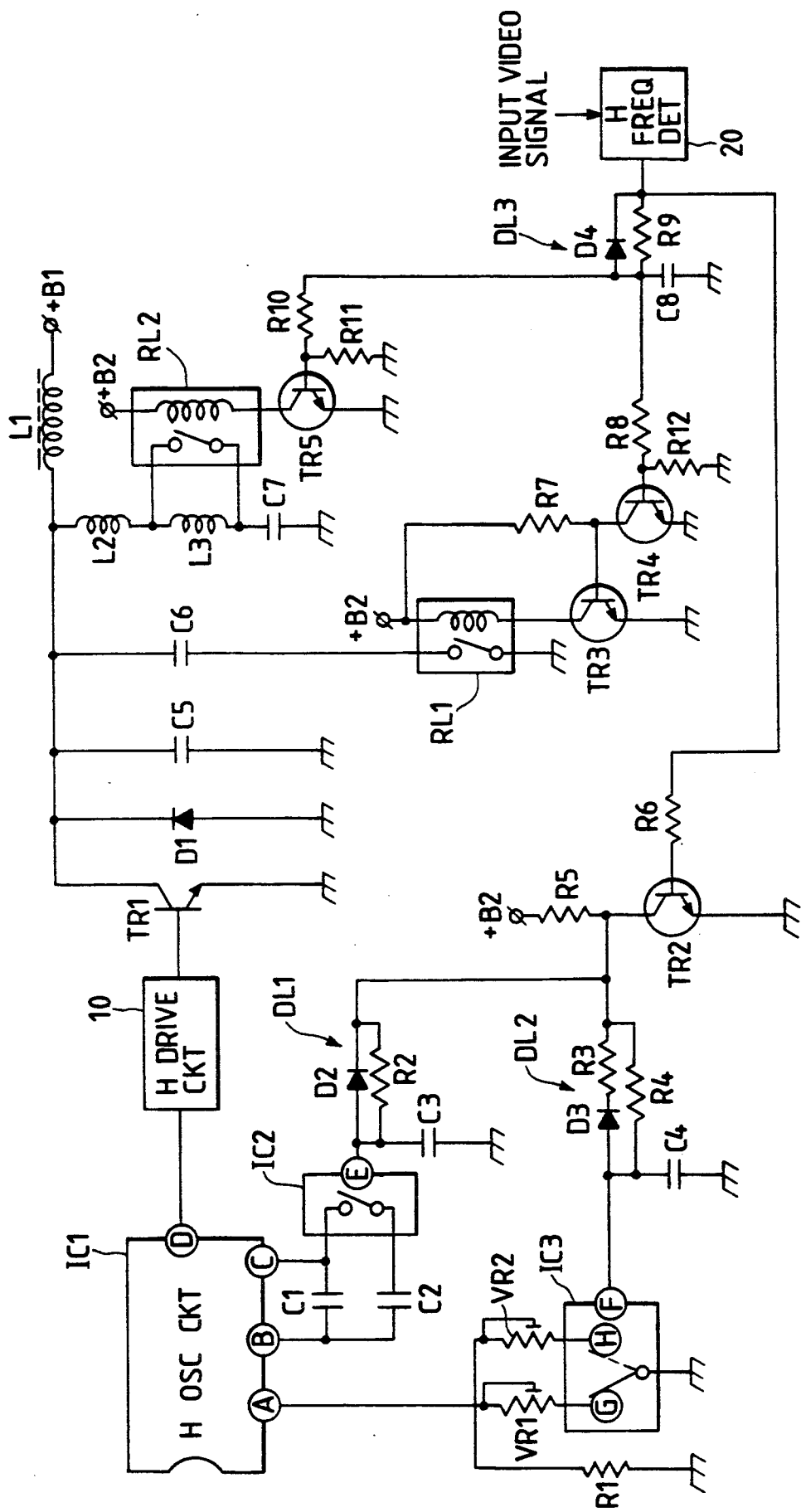
FIG. 1 is a diagram of a part of a television receiver according to an embodiment of this invention.

With reference to FIG. 1, a horizontal deflection output circuit includes a horizontal deflection output transistor TR1, a damper diode D1, a capacitor C5, horizontal deflection windings L2 and L3, and a capacitor C7. The base of the transistor TR1 is connected to the output terminal of a known horizontal drive circuit 10. The emitter of the transistor TR1 is grounded. The collector of the transistor TR1 is connected to a positive drive voltage line +B1 via a winding L1. The cathode of the diode D1 is connected to the collector of the transistor TR1. The anode of the diode D1 is grounded. One end of the capacitor C5 is connected to the collector of the transistor TR1. The other end of the capacitor C5 is grounded. The winding L2, the winding L3, and the capacitor C7 are connected in series in the order. The series combination of the windings L2 and L3 and the capacitor C7 is connected between the collector of the transistor TR1 and the ground. Specifically, the end of the winding L2 is connected to the collector of the transistor TR1 while the end of the capacitor C7 is grounded.

A known integrated-circuit chip IC1 designed for horizontal oscillation has an oscillation frequency control terminal A, horizontal drive pulse width control terminals B and C, and an oscillation output terminal D. The frequency of the oscillation of the horizontal oscillation circuit IC1 is controlled in accordance with the value (the resistance) of a load connected to the terminal A. The horizontal drive pulse width is controlled in accordance with the capacitance between the terminals B and C. The horizontal oscillation output signal appears at the terminal D, which is connected to the input terminal of the horizontal drive circuit 10.

One end of a resistor R1 is connected to the terminal A of the horizontal oscillation circuit IC1. The other end of the resistor R1 is grounded. An analog switch IC3 has fixed contacts G and H which are connected to the terminal A of the horizontal oscillation circuit IC1 via preset variable resistors VR1 and VR2 respectively. The analog switch IC3 has a movable contact which is selectively connected to one of the fixed contacts G and H. The movable contact of the analog switch IC3 is grounded. When the movable contact of the analog switch IC3 is connected to its fixed contact G, the load connected to the terminal A of the horizontal oscillation circuit IC1 is determined by the parallel combination of the resistors R1 and VR1. When the movable contact of the analog switch IC3 is connected to its fixed contact H, the load connected to the terminal A of the horizontal oscillation circuit IC1 is determined by the parallel combination of the resistors R1 and VR2. Since the resistors VR1 and VR2 are preadjusted so as to have different resistances, the resistance of the load connected to the terminal A of the horizontal oscillation circuit IC1 or the horizontal oscillation frequency is changed between a high value and a low value by the operation of the analog switch IC3. The high value and the low value of the horizontal oscillation frequency are predetermined by the adjustment of the variable resistors VR1 and VR2 so as to match with a high-frequency mode television signal and a low-frequency mode television signal. Specifically, the variable resistor VR1 is used to match the horizontal oscillation frequency with the low-frequency mode television signal. The variable resistor VR2 is used to match the horizontal oscillation frequency with the high-frequency mode television signal. The analog switch IC3 has a control terminal F. When the control terminal F is subjected to a high-level voltage, the movable contact of the analog switch IC3 is connected to its fixed contact G. When the control terminal F is subjected to a low-level voltage, the movable contact of the analog switch IC3 is connected to its fixed contact H.

A capacitor C1 is connected between the terminals B and C of the horizontal oscillation circuit IC1. One end of a capacitor C2 is connected to the terminal B of the horizontal oscillation circuit IC1. The other end of the capacitor C2 is connected to the terminal C of the horizontal oscillation circuit IC1 via an analog switch IC2. When the analog switch IC2 is closed, the capacitor C2 is connected between the terminals B and C of the horizontal oscillation circuit IC1 in addition to the capacitor C1 so that the total capacitance between the terminals B and C is increased. When the analog switch IC2 is opened, the capacitor C2 is disconnected from the terminal C of the horizontal oscillation circuit IC1 so that the total capacitance between the terminals B and C is decreased. Accordingly, the horizontal drive pulse width is changed between a large value and a small value by the operation of the analog switch IC2. The large value and the small value of the horizontal drive pulse width are predetermined so as to match with a low-frequency mode television signal and a high-frequency mode television signal respectively. The analog switch IC2 has a control terminal E. When the control terminal E is subjected to a high-level voltage, the analog switch IC2 is closed. When the control terminal E is subjected to a low-level voltage, the analog switch IC2 is opened.

One end of a capacitor C6 is connected to the collector of the transistor TR1. The other end of the capacitor C6 is grounded via the switch of a relay RL1. When the switch of the relay RL1 is opened, the capacitor C6 is disconnected from the ground so that only the capacitors C5 and C7 compose the capacitance part of a horizontal deflection resonant circuit. When the switch of the relay RL1 is closed, the capacitor C6 is connected to the ground so that all the capacitors C5-C7 compose the capacitance part of the horizontal deflection resonant circuit. Accordingly, the capacitance part of the horizontal deflection resonant circuit is changed between a large value and a small value by the operation of the relay RL1. The large value and the small value of the capacitance part of the horizontal deflection resonant circuit are predetermined so as to match with the low-frequency mode television signal and the high-frequency mode television signal respectively. The resonance frequency of the horizontal deflection resonant circuit determines the horizontal blanking period. As the capacitance part of the horizontal deflection resonant circuit increases, the horizontal blanking period lengthens. The switch of the relay RL1 is closed and opened when the control winding of the relay RL1 is energized and de-energized respectively.

It should be noted that, in general, the capacitance of the capacitor C7 is extremely greater than the capacitances of the capacitors C5 and C6 and therefore the capacitance part of the horizontal deflection resonant circuit is substantially determined by only the capacitors C5 and C6.

Opposite ends of the winding L3 are connected via the switch of a relay RL2. When the switch of the relay RL2 is closed, the winding L3 is short-circuited so that only the winding L2 forms the inductance part of the horizontal deflection resonant circuit. When the switch of the relay RL2 is opened, the short circuit of the winding L3 is removed so that both the windings L2 and L3 compose the inductance part of the horizontal deflection resonant circuit. Accordingly, the inductance part of the horizontal deflection resonant circuit is changed between a large value and a small value by the operation of the relay RL2. The large value and the small value of the inductance part of the horizontal deflection resonant circuit are predetermined so as to match with the low-frequency mode television signal and the high-frequency mode television signal respectively. As the inductance part of the horizontal deflection resonant circuit increases, the horizontal blanking period lengthens. The switch of the relay RL2 is closed and opened when the control winding of the relay RL2 is energized and de-energized respectively.

A known horizontal frequency detector 20 receives an input television signal (an input video signal). The horizontal frequency detector 20 detects whether the horizontal frequency of the input television signal is high (for example, 31.5 KHz) or low (for example, 15.75 KHz), that is, whether the input television signal is of the high-frequency mode or the low-frequency mode. The horizontal frequency detector 20 outputs a signal which depends on whether the input television signal is of the high-frequency mode or the low-frequency mode. Specifically, the output signal from the horizontal frequency detector 20 assumes a high level when the input television signal is of the high-frequency mode. The output signal from the horizontal frequency detector 20 assumes a low level when the input television signal is of the low-frequency mode.

The output signal from the horizontal frequency detector 20 is applied to the base of a transistor TR2 via a resistor R6. The emitter of the transistor TR2 is grounded. The collector of the transistor TR2 is connected to a positive drive voltage line +B2 via a resistor R5. The collector of the transistor TR2 is connected to the control terminal E of the analog switch IC2 via a delay network DL1 including a capacitor C3, a resistor R2, and a diode D2. When the output signal from the horizontal frequency detector 20 assumes the high level, the transistor TR2 is conductive so that a low-level signal is fed from the transistor TR2 to the control terminal E of the analog switch IC2 via the delay network DL1. When the output signal from the horizontal frequency detector 20 assumes the low level, the transistor TR2 is non-conductive so that a high-level signal is fed from the transistor TR2 to the control terminal E of the analog switch IC2 via the delay network DL1. The delay network DL1 has a time constant determined by the product of the values of the resistor R2 and the capacitor C3. The transmission of the high-level signal from the transistor TR2 to the control terminal E of the analog switch IC2 is delayed by the delay network DL1 by a time corresponding to its time constant. The diode D2 within the delay network DL1 functions to substantially nullify the time constant of the delay network DL1 with respect to the low-level signal, so that the transmission of the low-level signal from the transistor TR2 to the control terminal E of the analog switch IC2 is substantially not delayed by the delay network DL1.

In addition, the collector of the transistor TR2 is connected to the control terminal F of the analog switch IC3 via a delay network DL2 including a capacitor C4, resistors R3 and R4, and a diode D3. When the output signal from the horizontal frequency detector 20 assumes the high level, the transistor TR2 is conductive so that a low-level signal is fed from the transistor TR2 to the control terminal F of the analog switch IC3 via the delay network DL2. When the output signal from the horizontal frequency detector 20 assumes the low level, the transistor TR2 is non-conductive so that a high-level signal is fed from the transistor TR2 to the control terminal F of the analog switch IC3 via the delay network DL2. The delay network DL2 has a time constant which is determined by the product of the values of the resistor R4 and the capacitor C4 for the high-level signal, and which is determined by the product of the values of the resistor R3 and the capacitor C4 for the low-level signal. This different time constants of the delay network DL2 result from the function of the diode D3 within the delay network DL2. The transmission of the high-level signal from the transistor TR2 to the control terminal F of the analog switch IC3 is delayed by the delay network DL2 by a time corresponding to its time constant determined by the product of the values of the resistor R4 and the capacitor C4. The transmission of the low-level signal from the transistor TR2 to the control terminal F of the analog switch IC3 is delayed by the delay network DL2 by a time corresponding to its time constant determined by the product of the values of the resistor R3 and the capacitor C4.

The output signal from the horizontal frequency detector 20 is transmitted to the base of a transistor TR4 via a delay network DL3 and a resistor R8. The delay network DL3 includes a capacitor C8, a resistor R9, and a diode D4. The base of the transistor TR4 is grounded via a resistor R12. The emitter of the transistor TR4 is grounded. The collector of the transistor TR4 is connected to the positive drive voltage line +B2 via a resistor R7. The base of a transistor TR3 is connected to the collector of the transistor TR4. The emitter of the transistor TR3 is grounded. The collector of the transistor TR3 is connected to the positive drive voltage line +B2 via the control winding of the relay RL1. When the output signal from the horizontal frequency detector 20 assumes the high level, the transistor TR4 is conductive and the transistor TR3 is non-conductive so that the control winding of the relay RL1 is de-energized. When the output signal from the horizontal frequency detector 20 assumes the low level, the transistor TR4 is non-conductive and the transistor TR3 is conductive so that the control winding of the relay RL1 is energized.

The output signal from the horizontal frequency detector 20 is transmitted to the base of a transistor TR5 via the delay network DL3 and a resistor R10. The base of the transistor TR5 is grounded via a resistor R11. The emitter of the transistor TR5 is grounded. The collector of the transistor TR5 is connected to the positive drive voltage line +B2 via the control winding of the relay RL2. When the output signal from the horizontal frequency detector 20 assumes the high level, the transistor TR5 is conductive so that the control winding of the relay RL2 is energized. When the output signal from the horizontal frequency detector 20 assumes the low level, the transistor TR5 is non-conductive so that the control winding of the relay RL2 is de-energized.

The delay network DL3 has a time constant determined by the product of the values of the resistor R9 and the capacitor C8. The transmission of the high-level output signal from the horizontal frequency detector 20 to the transistors TR4 and TR5 is delayed by the delay network DL3 by a time corresponding to its time constant. The diode D4 within the delay network DL3 functions to substantially nullify the time constant of the delay network DL3 with respect to the low-level signal, so that the transmission of the low-level output signal from the horizontal frequency detector 20 to the transistors TR4 and TR5 is substantially not delayed by the delay network DL3.

The relation among the timings of the switching operations of the switches IC2 and IC3 and the relays RL1 and RL2 responsive to changes in the output signal from the horizontal frequency detector 20 is suitably designed so as to produce an advantage as will be explained later. The timings of the switching operations of the switches IC2 and IC3 and the relays RL1 and RL2 responsive to changes in the output signal from the horizontal frequency detector 20 depend on the time constants of the delay networks DL1, DL2, and DL3. Accordingly, the relation among the timings of the switching operations of the switches IC2 and IC3 and the relays RL1 and RL2 responsive to changes in the output signal from the horizontal frequency detector 20 is determined by the relation among the time constants of the delay networks DL1, DL2, and DL3. With respect to the transmission of the high-level signal from the transistor TR2 to the control terminals E and F of the analog switches IC2 and IC3, the time constant of the delay network DL1 is set greater than the first time constant of the delay network DL2 as expressed by "C3·R2>C4·R4". For example, the time constant of the delay network DL3 for the transmission of the high-level signal is set greater than the time constant of the delay network DL2 for the transmission of the low-level signal as expressed by "C8·R9>C4·R3".

When the input high-frequency mode television signal is replaced by the input low-frequency mode television signal, the output signal from the horizontal frequency detector 20 changes from the high level to the low level. This change in the output signal from the horizontal frequency detector 20 is directly transmitted to the transistor TR2, making the transistor TR2 non-conductive. In addition, this change in the output signal from the horizontal frequency detector 20 is transmitted to the transistors TR4 and TR5 via the delay network DL3 substantially without being delayed by the delay network DL3, making the transistors TR4 and TR5 non-conductive. When the transistor TR5 becomes non-conductive, the control winding of the relay RL2 is de-energized and thus the switch of the relay RL2 is opened so that the short circuit of the winding L3 is removed. As a result, the inductance part of the horizontal deflection resonant circuit is changed to the large value which matches to the low-frequency mode television signal. When the transistor TR4 becomes non-conductive, the transistor TR3 changes to the conductive state so that the control winding of the relay RL1 is energized. Thus, the switch of the relay RL1 is closed and therefore the capacitor C6 is connected to the ground. As a result, the capacitance part of the horizontal deflection resonant circuit is changed to the large value which matches to the low-frequency mode television signal. In this way, both the inductance part and the capacitance part of the horizontal deflection resonant circuit are increased so that the horizontal blanking period is lengthened to match to the low-frequency mode television signal. When the transistor TR2 becomes non-conductive, the high-level signal is transmitted to the control terminals E and F of the analog switches IC2 and IC3 via the delay networks DL1 and DL2 respectively. Thus, the analog switch IC2 is closed and thereby the capacitor C2 is connected between the terminals B and C of the horizontal oscillation circuit IC1 so that the horizontal drive pulse width is increased to the value corresponding to the low-frequency mode. In addition, the movable contact of the analog switch IC3 is connected to the fixed contact G thereof so that the load connected to the horizontal oscillation circuit IC1 is changed to the value corresponding to the low-frequency mode. As a result, the horizontal oscillation frequency changes to the low-frequency mode value. In this case, the delay network DL3 exhibits substantially a null time constant while the delay networks DL1 and the DL2 exhibit effective time constants, so that the change of the horizontal blanking period to the low-frequency mode value occurs before the changes of the horizontal drive pulse width and the horizontal oscillation frequency to the low-frequency mode values. In addition, the time constant of the delay network DL1 is greater than the time constant of the delay network DL2 so that the application of the high-level signal to the control terminal E of the analog switch IC2 occurs after the application of the high-level signal to the control terminal F of the analog switch IC3. Thus, the change of the horizontal oscillation frequency to the low-frequency mode value occurs before the change of the horizontal drive pulse width to the low-frequency mode value. This timing relation between the changes of the horizontal oscillation frequency and the horizontal drive pulse width is important as will be made clear hereinafter. If the horizontal drive pulse width changes to the low-frequency mode value before the horizontal oscillation frequency changes to the low-frequency mode value, the horizontal drive pulse width momentarily extends over the horizontal scanning period so that the switching element (the transistor TR1) of the horizontal deflection output circuit can move into an ON state during the moment of the occurrence of the rising edge of the horizontal deflection output pulse. In addition, if the change of the horizontal oscillation frequency occurs at first, the voltage height of the horizontal deflection output pulse will be doubled. Thus, in such assumed cases, the switching element can be subjected to an excessively high potential and therefore tends to be damaged.

Figure 5:
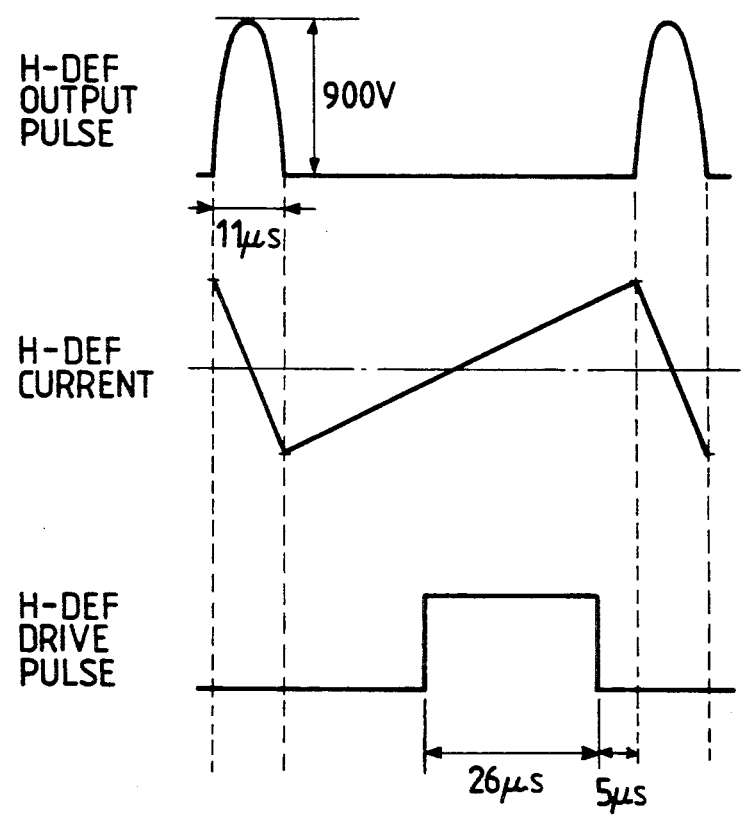

The operation which occurs during the change of the input television signal from the high-frequency (31.5 KHz) mode to the low-frequency (15.75 KHz) mode will be explained hereinafter with reference to FIGS. 2–5. While the input television signal remains in the high-frequency mode, the horizontal deflection output pulse, the horizontal deflection current, and the horizontal drive pulse have waveforms as shown in FIG. 2. The horizontal deflection output pulse determines the horizontal blanking period. When the input television signal changes from the high-frequency mode to the low-frequency mode, the horizontal blanking period lengthens at first as shown in FIG. 3. After the horizontal blanking period lengthens, the horizontal oscillation frequency decreases as shown in FIG. 4. Finally, the horizontal drive pulse width increases as shown in FIG. 5. Accordingly, the horizontal drive pulse width does not extend into the period of the presence of the horizontal deflection output pulse so that the switching element (the transistor TR1) of the horizontal deflection output circuit is prevented from moving into the ON state during the moment of the occurrence of the rising edge of the horizontal deflection output pulse. In addition, the voltage height of the horizontal deflection output pulse is prevented from being doubled. Thus, the switching element is prevented from the exposure to an excessively high potential.

When the input low-frequency mode television signal is replaced by the input high-frequency mode television signal, the output signal from the horizontal frequency detector 20 changes from the low level to the high level. This change in the output signal from the horizontal frequency detector 20 is directly transmitted to the transistor TR2, making the transistor TR2 conductive. In addition, this change in the output signal from the horizontal frequency detector 20 is transmitted to the transistors TR4 and TR5 via the delay network DL3 with undergoing an effective delay by the delay network DL3, making the transistors TR4 and TR5 conductive. When the transistor TR2 becomes conductive, the low-level signal is transmitted to the control terminals E and F of the analog switches IC2 and IC3 via the delay networks DL1 and DL2 respectively. Thus, the analog switch IC2 is opened and thereby the capacitor C2 is disconnected from the terminal C of the horizontal oscillation circuit IC1 so that the horizontal drive pulse width is decreased to the value corresponding to the high-frequency mode. In addition, the movable contact of the analog switch IC3 is connected to the fixed contact H thereof so that the load connected to the horizontal oscillation circuit IC1 is changed to the value corresponding to the high-frequency mode. As a result, the horizontal oscillation frequency changes to the high-frequency mode value. When the transistor TR5 becomes conductive, the control winding of the relay RL2 is energized and thus the switch of the relay RL2 is closed so that the winding L3 is short-circuited. As a result, the inductance part of the horizontal deflection resonant circuit is changed to the small value which matches to the high-frequency mode television signal. When the transistor TR4 becomes conductive, the transistor TR3 changes to the non-conductive state so that the control winding of the relay RL1 is de-energized. Thus, the switch of the relay RL1 is opened and therefore the capacitor C6 is disconnected from the ground. As a result, the capacitance part of the horizontal deflection resonant circuit is changed to the small value which matches to the high-frequency mode television signal. In this way, both the inductance part and the capacitance part of the horizontal deflection resonant circuit are decreased so that the horizontal blanking period is shortened to match to the high-frequency mode television signal. In this case, the delay networks DL2 and DL3 exhibit effective time constants while the delay network DL1 exhibits substantially a null time constant, so that the change of the horizontal drive pulse width to the high-frequency mode value occurs before the changes of the horizontal oscillation frequency and the horizontal blanking period to the high-frequency mode values. In addition, the time constant of the delay network DL2 is smaller than the time constant of the delay network DL3 so that the change of the horizontal oscillation frequency to the high-frequency mode value occurs before the change of the horizontal blanking period to the high-frequency mode value.

The operation which occurs during the change of the input television signal from the low-frequency (15.75 KHz) mode to the high-frequency (31.5 KHz) mode will be explained hereinafter with reference to FIGS. 2-5. While the input television signal remains in the low-frequency mode, the horizontal deflection output pulse, the horizontal deflection current, and the horizontal deflection drive pulse have waveforms as shown in FIG. 5. When the input television signal changes from the low-frequency mode to the high-frequency mode, the width of the horizontal deflection drive pulse shortens as shown in FIG. 4. After the width of the horizontal deflection drive pulse shortens, the horizontal oscillation frequency increases as shown in FIG. 3. Finally, the horizontal blanking period shortens as shown in FIG. 2.

What is claimed is:
1. A television receiver comprising:
detecting means for detecting changes in a horizontal frequency of an input television signal between a high frequency and a low frequency;
first changing means responsive to the detecting means for changing a horizontal oscillation frequency, a horizontal deflection drive pulse width, and a horizontal blanking period in a first predetermined sequence in response to a change in the horizontal frequency of the input television signal from the high frequency to the low frequency; and
second changing means responsive to the detecting means for changing the horizontal oscillation frequency, the horizontal deflection drive pulse width, and the horizontal blanking period in a second predetermined sequence in response to a change in the horizontal frequency of the input television signal from the low frequency to the high frequency, wherein the first and second predetermined sequences are opposite to each other.

2. The television receiver of claim 1 wherein the first changing means comprises means for changing the horizontal blanking period before changing the horizontal oscillation frequency, and means for changing the horizontal deflection drive pulse width after the change of the horizontal oscillation frequency; and wherein the second changing means comprises means for changing the horizontal deflection drive pulse width before changing the horizontal oscillation frequency, and means for changing the horizontal blanking period after the change of the horizontal oscillation frequency.

3. The television receiver of claim 1 wherein the high frequency and the low frequency of the horizontal frequency of the input television signal are equal to 31.5 KHz and 15.75 KHz respectively.

4. A method in a television receiver, comprising the steps of:
detecting changes in a horizontal frequency of an input television signal between a high frequency and a low frequency;
changing a horizontal oscillation frequency, a horizontal deflection drive pulse width, and a horizontal blanking period in a first predetermined sequence in response to a change in the horizontal frequency of the input television signal from the high frequency to the low frequency; and
changing the horizontal oscillation frequency, the horizontal deflection drive pulse width, and the horizontal blanking period in a second predetermined sequence in response to a change in the horizontal frequency of the input television signal from the low frequency to the high frequency, wherein the first and second predetermined sequences are opposite to each other.

* * * * *